(12) United States Patent
Kelly et al.

(10) Patent No.: US 9,725,617 B2
(45) Date of Patent: *Aug. 8, 2017

(54) LOW TOXICITY SOLVENT SYSTEM FOR POLYAMIDEIMIDE AND POLYAMIDE AMIC ACID RESIN COATING

(71) Applicant: FUJIFILM Hunt Chemicals U.S.A., Inc., Allendale, NJ (US)

(72) Inventors: Carissa M. Kelly, Dayton, TN (US); David E. Noga, Spring City, TN (US); John E. Sidenstick, Newport, TN (US); Limor Ben-Asher, Cresskill, NJ (US); Atsuo Kondo, Edgewater, NJ (US)

(73) Assignee: FUJIFILM Hunt Chemicals U.S.A., Inc., Delaware, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,771

(22) Filed: Apr. 15, 2015

(65) Prior Publication Data

US 2015/0299513 A1 Oct. 22, 2015

Related U.S. Application Data

(60) Provisional application No. 61/981,155, filed on Apr. 17, 2014.

(51) Int. Cl.
| | | |
|---|---|---|
| *C08G 73/14* | (2006.01) | |
| *C09D 179/08* | (2006.01) | |
| *C09D 7/00* | (2006.01) | |
| *C08G 73/10* | (2006.01) | |
| *C08G 18/76* | (2006.01) | |
| *C08G 18/34* | (2006.01) | |

(52) U.S. Cl.
CPC .......... *C09D 179/08* (2013.01); *C08G 18/345* (2013.01); *C08G 18/7671* (2013.01); *C08G 73/1035* (2013.01); *C08G 73/1067* (2013.01); *C08G 73/14* (2013.01); *C09D 7/001* (2013.01)

(58) Field of Classification Search
CPC .............................. C09D 179/08; C08G 73/14
See application file for complete search history.

(56) References Cited

U.S. PATENT DOCUMENTS

| | | |
|---|---|---|
| 3,346,502 A | 10/1967 | Harold |
| 3,393,153 A | 7/1968 | Zimmerer et al. |
| 3,463,764 A | 8/1969 | Hopwood et al. |
| 3,646,015 A | 2/1972 | Hamilton |
| 3,650,752 A | 3/1972 | Amano et al. |
| 3,666,470 A | 5/1972 | Tsuji et al. |
| 3,779,766 A | 12/1973 | Tsuji et al. |
| 3,790,530 A | 2/1974 | Koerner et al. |
| 3,843,587 A | 10/1974 | Keating et al. |
| 3,939,109 A | 2/1976 | Barie, Jr. et al. |
| 3,975,345 A | 8/1976 | Fessler |
| 4,003,947 A | 1/1977 | Peterson |
| 4,003,974 A | 1/1977 | Chantry et al. |
| 4,098,775 A | 7/1978 | Onder |
| 4,189,518 A | 2/1980 | Peterson |
| 4,408,032 A | 10/1983 | Sollner et al. |
| 4,428,978 A | 1/1984 | Jabs et al. |
| 4,497,944 A | 2/1985 | Nishizawa et al. |
| 4,950,700 A | 8/1990 | Balme et al. |
| 4,981,769 A | 1/1991 | Saeki et al. |
| 4,999,333 A | 3/1991 | Usami et al. |
| 5,002,924 A | 3/1991 | Seitz |
| 5,035,974 A | 7/1991 | Saeki et al. |
| 5,051,333 A | 9/1991 | Yanagihara et al. |
| 5,103,326 A | 4/1992 | Fergason |
| 5,231,117 A | 7/1993 | Seitz |
| 5,368,973 A | 11/1994 | Hasegawa |
| 5,756,647 A | 5/1998 | Schmid et al. |
| 5,948,607 A | 9/1999 | Uchida et al. |
| 6,265,128 B1 | 7/2001 | Hare et al. |
| 6,319,291 B1 | 11/2001 | Pedemonte |
| 6,340,550 B2 | 1/2002 | Hare et al. |
| 6,849,385 B2 | 2/2005 | Nagoya et al. |

(Continued)

FOREIGN PATENT DOCUMENTS

| | | |
|---|---|---|
| CN | 101218540 | 7/2008 |
| EP | 0587410 | 3/1994 |
| EP | 2791208 | 10/2014 |
| JP | S46-043896 | 1/1972 |
| JP | S49-052299 | 5/1974 |
| JP | S55-120628 | 9/1980 |
| JP | S58-080326 | 5/1983 |
| JP | 62202783 | 9/1987 |
| JP | S63-210120 | 8/1988 |

(Continued)

OTHER PUBLICATIONS

International Search Report and Written Opinion, PCT Application No. PCT/US2015/26255, mailed on Jul. 8, 2015, 8 pages.

(Continued)

*Primary Examiner* — Gregory Listvoyb

(74) *Attorney, Agent, or Firm* — Blakely, Sokoloff, Taylor & Zafman

(57) ABSTRACT

A polyamideimide and polyamide amic acid resin polymer that allows for reduced levels of toxicity in manufacturing. In an embodiment, a coating composition comprises at least one polyamideimide resin, at least one aprotic dialkylamide solvent and at least one co-solvent. In another embodiment, the at least one co-solvent is selected from a group consisting of methyl acetate, n-propyl acetate, t-butyl acetate, iso-butyl acetate, ethyl acetate, isopropyl acetate, methyl lactate, ethyl lactate, n-propyl lactate, isopropyl lactate, n-butyl lactate, isobutyl lactate, t-butyl lactate, cyclohexanone, cyclopentanone, n-butyl acetate, methyl alcohol, ethyl alcohol, isopropyl alcohol, n-acetyl morpholine, ε-caprolactone and methylcyclohexane.

15 Claims, 3 Drawing Sheets

(56) References Cited

U.S. PATENT DOCUMENTS

| | | | |
|---|---|---|---|
| 7,011,922 B2 | 3/2006 | Minami et al. | |
| 7,410,744 B2 | 8/2008 | Watanabe et al. | |
| 9,029,441 B2 * | 5/2015 | Sidenstick | C08G 73/14 524/100 |
| 2001/0003730 A1 | 6/2001 | Suzuki et al. | |
| 2001/0044553 A1 | 11/2001 | Kabashima et al. | |
| 2003/0060387 A1 | 3/2003 | Hsu et al. | |
| 2005/0043502 A1 | 2/2005 | Hikita et al. | |
| 2007/0042907 A1 | 2/2007 | Nagasawa et al. | |
| 2007/0098900 A1 | 5/2007 | Abe et al. | |
| 2007/0254138 A1 | 11/2007 | Remmer | |
| 2009/0208868 A1 | 8/2009 | Okazaki et al. | |
| 2012/0065296 A1 * | 3/2012 | Fujimoto | C08K 3/04 523/454 |
| 2013/0217812 A1 * | 8/2013 | Sidenstick | C08G 73/14 524/96 |
| 2015/0299393 A1 | 10/2015 | Kelly et al. | |

FOREIGN PATENT DOCUMENTS

| | | |
|---|---|---|
| JP | 2003145945 | 5/2003 |
| JP | 2007-099891 | 4/2007 |
| JP | 2011-231278 | 11/2011 |
| WO | WO-02078970 | 10/2002 |
| WO | WO-2007014847 | 2/2007 |
| WO | WO-2013090933 | 6/2013 |

OTHER PUBLICATIONS

Non-Final Office Action for U.S. Appl. No. 14/687,776 mailed on Dec. 9, 2015, 9 pages.

International Search Report and Opinion for PCT Application No. PCT/US2015/026224, mailed Jul. 8, 2015, 8 pages.

Non-Final Office Action for U.S. Appl. No. 14/365,459 mailed Dec. 9, 2015, 9 pages.

First Office Action for Chinese Patent Application No. 201280061393.6 (+ English Translation), mailed on Aug. 6, 2015, 16 pages.

Second Office Action for Chinese Patent Application No. 201280061393.6 (+ English Translation), mailed on Feb. 22, 2016, 7 pages.

European Search Report for European Patent Application No. 12 85 8583, mailed on Jun. 18, 2015, 6 pages.

International Search Results and Written Opinion for PCT Application No. PCT/US2012/070192, mailed on Mar. 29, 2013, 7 pages.

International Preliminary Report for PCT Application No. PCT/US2012/070192, mailed on Nov. 24, 2014, 11 pages.

Written Opinion from Singapore Patent Application No. 11201403244W mailed on Sep. 3, 2015, 11 pages.

Non-Final Office Action in U.S. Appl. No. 13/842,697 mailed on Jul. 30, 2014, 7 pages.

International Search Report and Written Opinion for PCT Application No. PCT/US2014/015610, mailed on May 12, 2014, 8 pages.

International Preliminary Report for PCT Application No. PCT/US2014/015610, mailed on Sep. 15, 2015, 7 pages.

Final Office Action for U.S. Appl. No. 14/365,459, mailed Jun. 20, 2016, 13 pages.

International Preliminary Report on Patentability from PCT/US2015/026255 dated Oct. 18, 2016, 7 pgs.

International Preliminary Report on Patentability from PCT/US2015/026224 dated Oct. 27, 2016, 8 pgs.

Office Action for Chinese Patent Application No. 201280061393.6, dated Oct. 8, 2016, 14 pgs.

Extended European Search Report for European Patent Application No. 14770839.0, dated Sep. 14, 2016, 9 pgs.

Office Action for European Patent Application No. 12858583.3, dated Oct. 19, 2016, 4 pgs.

Office Action for Japanese Patent Application No. 2014-547554, dated Sep. 6, 2016, 11 pgs.

Non-Final Office Action from U.S. Appl. No. 14/687,776 dated Sep. 8, 2016, 8 pgs.

Non-Final Office Action from U.S. Appl. No. 14/365,459 dated Nov. 17, 2016, 6 pgs.

* cited by examiner

Diluents acting as co-solvents 100a

| Main Solvent | NFM | NFM | NFM | NFM | NFM | NFM |
|---|---|---|---|---|---|---|
| Co-solvent | None | o-xylene | Methyl Acetate | Ethyl Acetate | N-butyl acetate | Isopropylacetate |
| Example Type | Comp. | Comp. | Emb. | Emb. | Emb. | Emb. |
| Average Viscosity Decrease (%) | 0 | 60 | 88 | 75 | 65 | 65 |
| Fuming Present (Post-Cure) | Yes | No | No | No | No | Yes |
| Odor Present (Post-Cure) | Yes | Yes | No | No | Slight | Slight |
| Degree of Color (Cured Film) | Light | Light | Lighter | Lighter | Lighter | Light |

Diluents acting as co-solvents 100b

| Main Solvent | NFM | NFM | NFM | NFM | NFM | NFM |
|---|---|---|---|---|---|---|
| Co-solvent | Cyclohexanone | Ethyl Lactate | Methanol | Isopropanol | Anisole | 2-acetyl piperidine |
| Example Type | Emb. | Emb. | Emb. | Emb. | Emb. | Emb. |
| Average Viscosity Decrease (%) | 70 | 33 | -- | 73 | -- | 50 |
| Fuming Present (Post-Cure) | No | Yes | No | No | No | Yes |
| Odor Present (Post-Cure) | No | Yes | Yes | No | No | Yes (not from NFM) |
| Degree of Color (Cured Film) | Lighter | Light | Lighter | Lighter | Light | Light |

FIG. 1

| Main Solvent | Co-solvent | NFM:Co-solvent Ratio | Example Type | Average Viscosity Decrease (%) | Comments |
|---|---|---|---|---|---|
| NFM | None | 100% | Comp. | — | Too viscous, medium color, poor boiling point (BP) or flashpoint for some coating applications. |
| NFM | γ-Hexalactone | 80:20 | Emb. | 35 | Very good viscosity reduction. |
| NFM | THF | 80:20 | Emb. | 76 | Excellent viscosity reduction. |
| NFM | Furfuryl Alcohol | 80:20 | Emb. | 7 | Viscosity reduction. |
| NFM | Acetophenone | 80:20 | Emb. | 34 | Very good viscosity reduction. |
| NFM | Cumene | 80:20 | Emb. | 45 | Very good viscosity reduction. |
| NFM | Cyclopentyl methyl ether | 80:20 | Emb. | 64 | Excellent viscosity reduction. |

Diluents acting as co-solvents 200a

FIG. 2A

| Main Solvent | NFM | NFM | NFM | NFM | NFM | NFM | NFM | NFM |
|---|---|---|---|---|---|---|---|---|
| Co-solvent | Methyl-THF | N-Octyl Pyrrolidone | Rhodiasolv® PolarClean | Propylene Carbonate | Dioxalane | Methylethyl ketone (MEK) | Dimethyl succinate | TamiSolve® NxG |
| NFM:Co-solvent Ratio | 80:20 | 80:20 | 70:30 | 70:30 | 70:30 | 70:30 | 70:30 | 70:30 |
| Example Type | Emb. | Emb. | Comp. | Emb. | Emb. | Emb. | Emb. | Emb. |
| Average Viscosity Decrease (%) | 73 | 29 | -30 | 1 | 72 | 88 | 32 | 47 |
| Comments | Excellent viscosity reduction. | Good viscosity reduction. | Very good toxicological profile. Very light color coating solution. | Better BP, flashpoint, and long term coating solution stability. | Excellent viscosity reduction. | Excellent viscosity reduction. Good curing profile. | Renewable resource and better long term coating solution stability. | Better BP and flashpoint. |

Diluents acting as co-solvents 200b

FIG. 2B

LOW TOXICITY SOLVENT SYSTEM FOR POLYAMIDEIMIDE AND POLYAMIDE AMIC ACID RESIN COATING

RELATED APPLICATIONS

The present patent application claims priority to and incorporates by reference the corresponding provisional patent application Ser. No. 61/981,155, titled, "Low Toxicity Solvent System for Polyamideimide and Polyamide Amic Acid Resin Coating Solutions Thereof" filed on Apr. 17, 2014.

BACKGROUND

1. Technical Field

Disclosed is a low toxicity solvent system used for the manufacture and use of polyamideimide and polyamic acid resin. The inventive solvent system can be used for either the manufacture polyamideimide resins or the dissolution of polyamideimide resins for use in coating solution applications.

2. Background Art

Polyamideimide and polyamide amic acid resin polymers (hereinafter referred to as PAI) are well-known thermally stable polymers that are used for many high performance coating applications due to their excellent adhesion, temperature resistance, and high strength. The primary route to synthesizing polyamideimide polymers in a form that is convenient for the manufacture of coatings is by reacting diisocyanate, often 4,4'-methylene diphenyldiisocyanate (MDI) with trimellitic anhydride (TMA). In this process, PAI polymers are typically manufactured in polar aprotic solvents such as N-methyl amide compounds including dimethylformamide, dimethylacetamide, N-methylpyrrolidone (NMP), N-ethylpyrrolidone. See for example U.S. Pat. No. 2,421,021, U.S. Pat. No. 3,260,691, U.S. Pat. No. 3,471,444, U.S. Pat. No. 3,518,230, U.S. Pat. No. 3,817,926, and U.S. Pat. No. 3,847,878.

BRIEF DESCRIPTION OF THE DRAWINGS

The various embodiments of the present invention are illustrated by way of example, and not by way of limitation, in the figures of the accompanying drawings and in which:

FIG. 1 shows tables illustrating features of coating compositions of solvents and co-solvents each according to a corresponding embodiment.

FIGS. 2A, 2B show tables illustrating features of coating compositions of solvents and co-solvents each according to a corresponding embodiment.

DETAILED DESCRIPTION

This invention relates to improved manufacturing methods of PAI resins using a solvent and co-solvent mixture and also to PAI-containing coating compositions comprising a PAI resin in a solvent and co-solvent mixture having a polymer solids content in solution of from about 15% to about 40%, preferably from about 20% to about 35%, by weight, based on the total solution weight.

A primary objective of certain embodiments of the present invention is to provide an improved solvent system for manufacturing of PAI resins. Examples of improvements to the manufacturing include lower toxicity, advantageous processing temperature, higher achievable molecular weight of the PAI resin, lighter color, and lower viscosity.

It is a further objective of some embodiments of the present invention to provide an improved solvent system for PAI resins useful for coating compositions such as, but not limited to, cookware, wire coating, aerospace, dry film lubricant, wire, flexible electronic, heat resistant ink, xerographic, and can coating compositions. In addition to lower toxicity, improvements to the PAI resin coating composition may include physical and chemical characteristics of the coating composition itself, such as higher molecular weight, lower viscosity, and lighter solution color. Additionally, application of the coating composition may be improved with the use of this solvent system by allowing proper viscosity, minimal fuming upon drying, and flowability. A further advantage is also achieved in improvements to the resin coating itself after curing—lighter resin color, as well as such film forming properties as tensile strength, modulus, elongation, rub resistance, scratch resistance and the like, are equal to or better than those resins prepared from conventional toxic solvents and solvent systems.

The most commonly used diluent and solvent for both manufacturing and preparing coating compositions of PAI resins is an N-methyl amide type of solvent, in particular N-methyl pyrrolidone (NMP). However, NMP is known to be toxic and therefore there is a need to find suitable other solvents. Alternate solvents such as tetrahydrofuran, methyl ethyl ketone, gamma-butyrolactone, or dimethyl sulfoxide have drawbacks such as low polymer solubility or poor storage stability, which may change the polymer properties and application performance of the polymer resin as well as other practical considerations.

For example, gamma-butyrolactone has neurological properties that make it subject to regulation and restrictive use on a practical industrial level and therefore unsuitable for general use in formulations. Dimethylol ethylene urea has not had extensive toxicological studies performed and contains an N-methylamide functionality suspected of negative environmental and health impacts. New solvents, such as those described in EP 2123631B, for example 3-methoxy-N,N-dimethylpropionamide, may be too expensive or have not been fully tested for long term toxicity.

Therefore, on a practical level, these solvents known in the art, while they may be useful for manufacturing and dissolving PAI in industrial resin coating compositions, are also recognized for having toxicity concerns. By contrast, certain embodiments variously provide advantages to manufacture and dissolve PAI type polymers using a solvent system with minimal health and safety impact while maintaining the advantages of both the resin itself and other composition components.

In an effort to achieve safer alternatives, in particular a solvent system for PAI free from the commonly-used N-methyl amide solvents, the use of alternative lower toxicity solvents is necessary. Acetamides are of interest due to their relatively low toxicity and preparation from industrially available dialkyl amines. In particular, dialkylamides are useful. N-formyl morpholine (NFM) and N-acetyl morpholine (NAM) are solvents of the embodiments of the present invention which have lower toxicity and are found to be suitable for manufacturing of PAI and also for use in making polyamideimide resin coating solutions. Other useful and low toxicity solvents of the invention are diethyl acetamide (DEAc), di-n-propyl acetamide, diacetylpiperazine, N,N-diisopropylacetamide (DIPAc), di-n-butylacetamide (DIBAc), di-n-propylacetamide (DIPA), and N-propionyl morpholine (NPM). These solvents are described in published applications US App. Publication No. 2013/0217812A and WO2013090933A the contents of which are hereby incorporated by reference in their entirety. To achieve a lower toxicity process, the manufacturing and dissolution of PAI resins may be accomplished by the use of aprotic dialkylamide solvents in combination with the use of one or more dipolar generally aprotic co-solvents to provide a unique solvent system as an embodiment of the present invention.

To further improve PAI resin manufacturing and dissolution, low toxicity dipolar and/or aprotic co-solvents of the embodiments of the present invention may be used to lower the viscosity of the final polymer solution relative to PAI manufactured solely in the dialkylamide solvents of the embodiments of the present invention, as described in published applications US App. Publication No. 2013/0217812A and WO2013090933A. A further advantage of the incorporation of one or more co-solvents during manufacturing may be to minimize color formation of the resin when the polymerization temperature is increased. Additionally, use of co-solvents may decrease fuming of the resin solutions during curing when high boiling dialkylamide solvents of the embodiments of the present invention are cured to form polymer coatings, as well as decrease the curing temperature. Other advantages of the addition of co-solvents to the coating composition embodiments of the present invention are to reduce fuming and odor during curing, minimize corrosion of the substrates, improve flexibility and modulus of the dried and cured coating resin. Further advantages will be obvious after review of the examples as described.

A co-solvent may be defined as a second solvent added to one or more original solvents, generally in smaller concentrations than the solvent, to form a mixture that has greatly enhanced solvent powers. Preferred lower toxicity co-solvents of the embodiments of the present invention are selected from the group consisting of at least one of the following: methyl acetate, n-propyl acetate, t-butyl acetate, iso-butyl acetate, ethyl acetate, isopropyl acetate, methyl lactate, ethyl lactate, n-propyl lactate, isopropyl lactate, n-butyl lactate, isobutyl lactate, t-butyl lactate, cyclohexanone, cyclopentanone, n-butyl acetate, methyl alcohol, ethyl alcohol, isopropyl alcohol, anisol, n-acetyl morpholine, $\epsilon$-caprolactone, methylcyclohexane, N-n-butylpyrrolidone, N-isobutylpyrrolidone, N-t-butylpyrrolidone, N-n-pentylpyrrolidone, N-(methyl-substituted butyl) pyrrolidone, ring-methyl-substituted N-propyl pyrrolidone, ring-methyl-substituted N-butyl pyrrolidone, N-(methoxypropyl) pyrrolidone, N-(methoxypropyl) pyrrolidone, 1,5-dimethyl-pyrrolidone and isomers thereof, dipropylene glycol dimethyl ether, a mixture including ethyl lactate and an ethyl ester derived from soya bean oil or corn oil, poly(ethylene glycol) dimethyl ether, diethylene glycol diethyl ether, 1,3-dioxolane, dimethyl sulphoxide, methyl-5-(dimethylamino)-2-methyl-5-oxopentanoate, TamiSolve® NxG from Eastman Chemical Co. of Kingsport, Tenn., propylene glycol methyl ether acetate, choline hydroxide, propylene carbonate, diethyl carbonate, glycerine carbonate, dimethylisopropylamine and isomers thereof, dihydrolevo glucosenone, octyl pyrrolidone and isomers thereof, N-methyl-$\epsilon$-caprolactam, N,N,N',N'-tetramethylguanidine, 2-pyrrolidone, 2,2-dimethyl dioxolane-4-methanol and isomers thereof, Rhodiasolv® RPDE-K from Rhodia Chemical Co. of La Defense, France, Rhodiasolv® PolarClean from Rhodia Chemical Co., Rhodiasolv® Infinity from Rhodia Chemical Co., Rhodiasolv® IRIS from Rhodia Chemical Co., diethylethanolamine, N-ethylmorpholine, $\gamma$-hexalactone, tetrahydrofuran (THF), furfuryl alcohol, acetophenone, cumene, cyclopentylmethyl ether, methyl-tetrahydrofuran (methyl-THF), N-octyl pyrrolidone, dioxalane, methylethylketone, dimethylsuccinate, N-methylcaprolactame and N-cyclohexylpyrrolidone.

More preferably, the co-solvents of the embodiments of the present invention are selected from the group consisting of at least one of the following: methyl acetate, ethyl acetate, n-propyl acetate, iso-propyl acetate, n-butyl acetate, iso-butyl acetate, t-butyl acetate, methyl lactate, ethyl lactate, n-propyl lactate, iso-propyl lactate, n-butyl lactate, iso-butyl lactate, t-butyl lactate, cyclopentanone, cyclohexanone, methylcyclohexane, methyl alcohol, ethyl alcohol, n-propyl alcohol, iso-propyl alcohol, n-butyl alcohol, iso-butyl alcohol, n-acetyl morpholine, $\epsilon$-caprolactone, anisol. More preferably, the co-solvents of the embodiments of the present invention are selected from the group consisting of at least one of the following: methyl actetate, n-propyl acetate, ethyl acetate, isopropyl acetate, ethyl lactate, n-propyl lactate, n-butyl lactate, cyclohexanone, cyclopentanone, n-butyl acetate, isopropyl alcohol, anisole, $\epsilon$-caprolactone, methylcyclohexane. Most preferably, the co-solvents of the embodiments of the present invention are selected from the group consisting of at least one of the following: methyl acetate, n-propyl acetate, ethyl acetate, isopropyl acetate, ethyl lactate, n-propyl lactate, n-butyl lactate, cyclohexanone, n-butyl acetate, isopropyl alcohol, anisole, $\epsilon$-caprolactone, methylcyclohexane.

The use of a combination of at least one solvent and at least one co-solvent in PAI manufacturing may provide several technical advantages. In addition to the solvent system being the medium for the manufacturing, the advantages include, but are not limited to, the ability to obtain desired physical properties—molecular weight and polymeric molecular structure, such as branched vs linear for example, as well as chemical properties. The chemical properties include, but are not limited to viscosity, acid value, pH, and volatile content. The specific desired properties will vary depending on the end-use application, such as wire coating, cookware or can coatings, dry film lubricants, and the like. The solvent plus co-solvent system may be used to dilute the PAI in the manufacturing process to obtain the desired resin concentration.

The combination of at least one solvent and at least one co-solvent of the embodiments of the present invention may further be used to dilute the manufactured PAI resin solution to prepare a useable coating solution by the end user. In these uses, the coating solutions are prepared that dissolve the PAI resin plus other functional coating composition components as needed, to produce a coating solution that has optimum performance properties.

Manufacturing

One manufacturing method of PAI is in a solvent system solution in which a diisocyanate, typically 4,4'-methylenediphenyldiisocyanate (MDI) reacts with trimellitic anhydride (TMA). The PAI produced may be a high molecular weight polymer solution with no condensation byproducts, since carbon dioxide gas may be produced as an easily removed by-product. The solution viscosity may be controlled by such factors as stoichiometry, the solvents, co-solvents, reagents, and resulting polymer solids.

N-formyl morpholine (NFM) and N-acetyl morpholine (NAM) are more preferred solvents of the embodiments of the present invention which have lower toxicity and are found to be suitable for manufacturing of PAI. Other useful and low toxicity preferred solvents as embodiments of the invention are diethyl acetamide (DEAc), di-n-propyl acetamide, diacetylpiperazine, N,N-diisopropylacetamide (DI- PAc), di-n-butylacetamide (DIBAc), di-n-propylacetamide (DIPA), and N-propionyl morpholine (NPM).

Preferred lower toxicity co-solvents of the embodiments of the present invention are selected from the group consisting of at least one of the following: methyl acetate, ethyl acetate, n-propyl acetate, iso-propyl acetate, n-butyl acetate, iso-butyl acetate, t-butyl acetate, methyl lactate, ethyl lactate, n-propyl lactate, iso-propyl lactate, n-butyl lactate, iso-butyl lactate, t-butyl lactate, cyclopentanone, cyclohexanone, methylcyclohexane, methyl alcohol, ethyl alcohol, n-propyl alcohol, iso-propyl alcohol, n-butyl alcohol, iso-butyl alcohol, n-acetyl morpholine, ε-caprolactone, anisol. More preferably, the co-solvents of the embodiments of the present invention are selected from the group consisting of at least one of the following: methyl actetate, n-propyl acetate, ethyl acetate, isopropyl acetate, ethyl lactate, n-propyl lactate, n-butyl lactate, cyclohexanone, cyclopentanone, n-butyl acetate, isopropyl alcohol, anisole, ε-caprolactone, methylcyclohexane. Most preferably, the co-solvents of the embodiments of the present invention are selected from the group consisting of at least one of the following: methyl acetate, n-propyl acetate, ethyl acetate, isopropyl acetate, ethyl lactate, n-propyl lactate, n-butyl lactate, cyclohexanone, n-butyl acetate, isopropyl alcohol, anisole, ε-caprolactone, methylcyclohexane.

In addition, in order to achieve a clear, non-hazy PAI solution free from precipitates, certain embodiments provide effective ratios of solvents, co-solvents and polyamide imide. In some embodiments of the present invention, the ratio of the total of all aprotic dialkylamide solvents plus all co-solvents to polyamideimide is in a range from 85:15 to 60:40 and more preferably in a range from 80:20 to 65:35.

Further, a ratio of all aprotic dialkylamide solvents to all co-solvents may be in a range from 95:5 about 55:45 and more preferably in a range from 90:10 to 70:30. Known alternative manufacturing methods of the PAI polymer are by using a monomer such as methylene dianiline (MDA). MDA is a monomer known to highly be toxic and therefore are of limited use with the less toxic solvents of the embodiments of the present invention.

Coating

In addition to the solvent system for manufacturing of PAI, the inventive solvents may further act as diluents for coating solutions using the PAI resins. In addition, the solvent system provides proper viscosity which allows coat ability and other proper function of the coating solution, such as flowability, smooth drying and the like. Finally, in some embodiments a solvent system contributes to a final performance of dried coating, such as a smooth and even coating without voids, surface roughness, unevenness, or surface defects, while maintaining or improving flexibility. Other requirements of the specific coating composition use and application include effective evaporation rate. Examples of the coating process that may be used with the coating composition embodiments of the present invention are, but are not limited to, spraying, dipping, slot, bar, and kiss coating. These methods are used apply the coating composition to form the final dried resin.

To achieve this, a one or more dialkylamide solvents may be used to obtain the desired viscosity in combination with co-solvents of low toxicity. N-formyl morpholine (NFM) and N-acetyl morpholine (NAM), which are solvents of lower toxicity, have been found to be suitable for manufacturing of PAI and also for use in making polyamideimide resin coating solutions. Other useful and low toxicity solvents of the invention are diethyl acetamide (DEAc), di-n-propyl acetamide, diacetylpiperazine, N,N-diisopropylacetamide (DIPAc), di-n-butylacetamide (DIBAc), di-n-propylacetamide (DIPA), and N-propionyl morpholine (NPM).

Diluents acting as co-solvents for dissolution of PAI resins as an embodiment of the present invention are selected from the group consisting of at least one of the following: methyl acetate, ethyl acetate, n-propyl acetate, iso-propyl acetate, n-butyl acetate, iso-butyl acetate, t-butyl acetate, methyl lactate, ethyl lactate, n-propyl lactate, iso-propyl lactate, n-butyl lactate, iso-butyl lactate, t-butyl lactate, cyclopentanone, cyclohexanone, methylcyclohexane, methyl alcohol, ethyl alcohol, n-propyl alcohol, iso-propyl alcohol, n-butyl alcohol, iso-butyl alcohol, n-acetyl morpholine, ε-caprolactone, anisol. More preferably, the co-solvents of the embodiments of the present invention are selected from the group consisting of at least one of the following: methyl actetate, n-propyl acetate, ethyl acetate, isopropyl acetate, ethyl lactate, n-propyl lactate, n-butyl lactate, cyclohexanone, cyclopentanone, n-butyl acetate, isopropyl alcohol, anisole, ε-caprolactone, methylcyclohexane. Most preferably, the co-solvents of the embodiments of the present invention are selected from the group consisting of at least one of the following: methyl acetate, n-propyl acetate, ethyl acetate, isopropyl acetate, ethyl lactate, n-propyl lactate, n-butyl lactate, cyclohexanone, n-butyl acetate, isopropyl alcohol, anisole, ε-caprolactone, methylcyclohexane.

Because of its tribological and electrical properties, adhesion, flexibility, chemical and thermal stability, abrasion and heat resistance, as well as other properties, PAI polymer resins are used as a main component for the film coating of cookware, wire coating, aerospace, dry film lubricant, wire, flexible electronic, heat resistant ink, xerographic, and can coating compositions, as well as other applications known within the polymer and thermoset coating industries. In particular, PAI may be used in, but is not limited to, coating solutions that contain polytetrafluoroethylene (PTFE), a synthetic fluoropolymer of tetrafluoroethylene that has numerous high performance coating uses and applications. PAI may be used to improve the intrinsic difficulty of PTFE adhesion to metal surfaces. One function of PAI is to allow increased PTFE-containing coating solutions adhesion to enhance non-stick coating properties.

In some embodiments, a chemical requirement of each of these coating compositions is a solvent necessary to dissolve all of the chemical components and improve and enhance the coating solution performance. Coating solution performance includes but may not be limited to the providing the following coating film properties, depending upon the use of the final coating application: tensile strength, coatability, preventing voids, maintaining flexibility without brittleness, minimal fuming upon heating of the coating in the drying process to adhere the coating to the treated surface. A further description of PAI polymer coating applications are found in *Handbook of Plastic Processes* by Charles A. Harper, John Wiley & Sons Inc., 2006.

Prior art PAI coating compositions containing various solvent systems plus other necessary components for the various described applications useful with the present invention are described in various patents including but not limited to the following, all incorporated herein by reference.

1. Cookware: Tannenbaum (1992), U.S. Pat. No. 5,079,073 and Cardoso et al (2012), U.S. Pat. No. 8,158,251 describe cookware coatings that provides scratch resistance, minimal sticking, and that may be used on smooth untreated substrates due to the incorporation of PAI into compositions which also contains PTFE. More thorough discussions of cookware coating compositions containing PAI may also be found in the book *Introduction to Fluoropolymers: Materials, Technology and Applications* by Sina Ebnesajjad, Elsevier Inc. 2013.

2. Can Coating: Tada et al (1998), U.S. Pat. No. 5,750,223 describes an aerosol can inner coating having excellent chemical resistance due to coating with PAI. PAI may be manufactured in NMP and then dissolved in a solvent mixture of NMP, xylene, MEK, and cyclohexanone with PAI content of 30% to prepare a thermosetting PAI coating composition.

3. Wire and Electronic Parts Coating: Kato (1992), U.S. Pat. No. 5,089,549 and Arnold (1985), U.S. Pat. No. 4,495,321 both describe alternative or co-solvents to NMP for PAI coating composition solutions for wire and electronic parts resin coatings.

4. Dry Film Lubricant: Gouider et al (2014), WO2014041017A describes a process for producing a dry film lubricant from a composition comprising PAI and solvents that do not contain so-called CMR substances, highlighting the need for solvents that are free of severe health hazards global regulatory restrictions. The PAI coating composition may also comprise solid lubricating particles selected from the list including graphite, boron nitride, $Bi_2O_3$, $MoS_2$, $WS_2$, and fluoropolymers.

Fujimoto and Hasegawa (2014), U.S. Pat. No. 8,669,305 demonstrate the need for less toxic solvents for PAI coating compositions. As described in this art, the PAI resin coating compositions are free of NMP and instead include gamma-butyrolactone and cyclopentanone, used in combination with the other necessary processing components to provide heat-resistant, chemical-resistant, sliding characteristics and insulating characteristics as well as other components and additives are known to those skilled in the art.

MANUFACTURING EXAMPLES

In order to manufacture a clear, non-hazy PAI solution free from precipitates, it may be necessary to have effective ratios of solvents, co-solvents and polyamide imide. In the embodiments of the present invention, the ratio of the total of all aprotic dialkylamide solvents plus all co-solvents to polyamideimide may be preferably in a range from 85:15 to 60:40 and more preferably from 80:20 to about 65:35.

Further, a ratio of all aprotic dialkylamide solvents to all co-solvents may preferably be in a range from 95:5 to 55:45 and more preferably in a range from 90:10 to 70:30.

The following examples are provided to illustrate the invention in accordance with the principals of this invention, including examples of a comparative nature, but are not intended to limit the invention in any way.

Reference Manufacturing Example 1

Manufacturing PAI in NFM (No Co-Solvents)

To a 20 liter (L) manufacturing vessel equipped with a mechanical stirrer and a condenser, 4430.3 grams (g) NFM is added. After adding 2927.3 g of MDI, heating is started to 90° C. After MDI dissolution, 2247.0 g TMA is added. The reaction continues to be heated at 90° C. with stirring until the desired molecular weight is achieved (~36 hours). NFM dilutions are added incrementally to reduce the viscosity to achieve target viscosity specification. Upon reaching the desired molecular weight, the reaction the solution is quenched to 26% solids through the addition of the appropriate amount of NFM. The clear yellow/orange solution is then cooled to 35° C. Analysis results of the manufactured solution shows: final solid resin concentration (Solids)=27.36%; Viscosity (DVII, 23° C.)=6,932 centipoise (cps); and molecular weight (Mw)=21 kg/mol.

Reference Manufacturing Example 2

PAI in NFM (No Co-Solvents)

To a 1 L reaction vessel equipped with a mechanical stirrer and a condenser, 142.4 g NFM is added. After adding 52.8 g of MDI, the solution is heated to 90° C. After MDI dissolution, 40.5 g TMA is added. The reaction continues to be heated at 90° C. for 2 (hr) with stirring. After 2 hr, the reaction temperature is raised to 160° C. until the desired molecular weight is achieved (~10 hr) at which point 116 g of NFM is added to quench the reaction solution. The clear darker orange-brownish colored solution is then cooled to 35° C. Analysis results of the manufactured solution shows: % Solids=21.72%, Viscosity (DVII, 23° C.)=113,000 cps; Mw=66 kg/mol.

Reference Manufacturing Example 3

To a 2 L reaction vessel equipped with a mechanical stirrer and a condenser, 443 g NFM is added. After adding 292.7 g of MDI, 7.47 g MDI is added and heating is started to 90° C. After MDI dissolution, 224.7 g TMA is added. The reaction continues to be heated at 90° C. with stirring until the desired molecular weight is achieved (~36 h). NFM dilutions are added incrementally to reduce the viscosity to achieve target viscosity specification. Upon reaching the desired molecular weight, 522 g NFM is added and then the clear slightly yellow/orange solution is cooled to (35° C.). Analysis results of the manufactured solution shows: % Solids=27.40%, Viscosity (DVII, 23° C.)=6,932 cps. Mw=21 kg/mol.

Manufacturing Embodiment Example 1

Dipolar and/or aprotic co-solvents, such as the one used in examples of the embodiments of the present invention, may be used to lower the viscosity and reduce the color of the final polymer solution relative to PAI synthesized in NFM solution alone.

The co-solvents may also be used to decrease fuming in high boiling solvents such as NFM when the resin solutions are cured to form polymer coatings as well as decrease the curing temperature. A further advantage of the co-solvents may be to minimize color formation of the resin solution when the polymerization temperature is increased.

Inventive Example: PAI in NFM with ethyl acetate co-solvent: To a 2 L reaction vessel equipped with a mechanical stirrer and a condenser, 443 g NFM is added. After adding 292.7 g of MDI, heating is started to 90° C. After MDI dissolution, 224.7 g TMA is added. The reaction continues to be heated at 90° C. with stirring until the desired molecular weight is achieved (~36 h). NFM dilutions are added incrementally to reduce the viscosity to achieve target viscosity specification. Upon reaching the desired molecular weight, 264 g NFM is. The clear slightly yellow/orange solution is then cooled to 35° C. and an appropriate amount of ethyl acetate is added to obtain a final NFM:EA ratio in a range between 70:30 and 80:20%.

COATING COMPOSITION EXAMPLES

In order to provide a clear, non-hazy PAI coating composition solution free from precipitates, it is necessary to have effective ratios of solvents, co-solvents and polyamide imide. In the embodiments of the present invention, the ratio of the total of all aprotic dialkylamide solvents plus all co-solvents to polyamideimide is preferably in a range from 85:15 to 60:40 and more preferably is in a range from 80:20 to 65:35.

Further, the ratio of all aprotic dialkylamide solvents to all co-solvents is preferably in a range from 95:5 to 55:45 and more preferably in a range from 90:10 to 70:30.

Reference Coating Composition Example 1

A solution of PAI was prepared in NFM at 32.4 wt/wt % resin concentration. The PAI resin was further diluted to 25% solids with n-acetyl morpholine (equivalent to a total weight percent of 22% co-solvent). Viscosity and film tests were performed using the final resin coating solution. No viscosity improvement was observed when compared to a 25% NFM-only dilution. Fuming and smell were present during a 250° C. curing of the resin.

Reference Coating Composition Example 2

PAI powder was diluted in NFM at 32.4 wt/wt % resin concentration. The PAI resin was further diluted to 25% solids with furfuryl alcohol (equivalent to a total weight percent of 22% co-solvent). Viscosity and film testing were performed. The viscosity of the final resin coating solution was decreased by 25% compared to a 25% solids NFM-only dilution. Slightly reduced fuming was observed upon a 250° C. cure of the resin. The color of both the final coating solution and coated film was darker in hue compared to the NFM-only dilution. The odor during the curing process was observed to be a strong licorice odor.

Coating Composition Embodiment Example 1

A solution of PAI was prepared in NFM at 32.4 wt/wt % resin concentration. The NFM concentration was 67.6 wt/wt %. The PAI resin was further diluted to 25% solids with o-xylene (equivalent to a total weight percent of 22% co-solvent). Viscosity and film testing were performed. The viscosity of the final resin solution was advantageously decreased by 60% compared to a 25% solution of PAI using only NFM for dilution. No fuming was observed upon curing the coated resin solution at 250° C.

Coating Composition Embodiment Example 2

PAI powder was diluted in NFM at 32.4% and 37% wt/wt % resin concentration. The PAI resin was further diluted to 25% solids with ethyl acetate (equivalent to a total weight percent of 22% and 32% co-solvent, respectively). Viscosity and film testing were performed. The viscosity of the final resin was decreased by 70-80% compared to a 25% solids NFM-only dilution. No fuming or odor was observed upon a 250° C. cure of the resin. The color of the final resin coating solution and film was lighter in hue compared to the NFM-only diluted solution. After coating with the solution, better adhesion, cohesion, and less bubbling in the final film was observed.

Coating Composition Embodiment Example 3

A solution of PAI was prepared in NFM at 32.4% and 37 wt/wt % resin concentration. The PAI resin was further diluted to 25% solids with methyl acetate (equivalent to a total weight percent of 22% and 32% co-solvent). Viscosity and film tests were performed. The viscosity of the final resin was decreased by 85-90% compared to a 25% solids NFM-only dilution. Minimal fuming and odor were observed upon curing the coated resin solution at 250° C. The color of both the final resin coating solution and coated and dried film was lighter in hue compared to the NFM-only diluted resin solution. Better adhesion, cohesion, and less bubbling in the final film was observed.

Coating Composition Embodiment Example 4

PAI powder was diluted in NFM at 32.4 wt/wt % resin concentration. The PAI resin was further diluted to 25% solids with isopropyl acetate (equivalent to a total weight percent of 22% co-solvent). Viscosity and film tests were performed. The viscosity of the final resin coating solution was decreased by 65% compared to a 25% solids NFM-only dilution. Slightly reduced fuming was observed upon curing the coated resin solution at 250° C. The color of the final solution and film was lighter in hue compared to the NFM-only diluted resin solution.

Coating Composition Embodiment Example 5

PAI powder was diluted in NFM at 32.4 wt/wt % resin concentration. The PAI resin was further diluted to 25% solids with ethyl lactate (equivalent to a total weight percent of 22% co-solvent). Viscosity and film testing were performed. The viscosity of the final resin coating solution was decreased by 30-35% compared to a 25% solids NFM-only dilution. Slightly reduced fuming was observed upon a 250° C. cure of the resin. The color of the final solution and film was lighter in hue compared to the NFM-only diluted resin solution.

Coating Composition Embodiment Example 6

A solution of PAI was prepared in NFM at 32.4 wt/wt % resin concentration. The PAI resin was further diluted to 25% solids with ethyl lactate (equivalent to a total weight percent of 22% co-solvent). Viscosity and film tests were performed. The viscosity of the final resin coating solution was decreased by 50% compared to a 25% solids NFM-only dilution. Slightly reduced fuming was observed upon a 250° C. cure of the resin. The color of both the final coating solution and coated film was lighter in hue compared to the NFM-only dilution.

Coating Composition Embodiment Example 7

PAI powder was diluted in NFM at 32.4% and 37 wt/wt % resin concentration. The PAI resin was further diluted to 25% solids with cyclohexanone (equivalent to a total weight percent of 22% and 32% co-solvent). Viscosity and film tests were performed. The viscosity of the final resin coating solution was decreased by 65-75% compared to a 25% solids NFM only dilution. No fuming or odor was observed upon a 250° C. cure of the resin. The color of the final solution and film was lighter in hue compared to the NFM only dilution. Better adhesion, cohesion, and less bubbling in the final film was observed.

Coating Composition Embodiment Example 8

PAI powder was diluted in NFM at 32.4 wt/wt % resin concentration. The PAI resin was further diluted to 25% solids with n-butyl acetate (equivalent to a total weight percent of 22% co-solvent). Viscosity and film tests were performed. The viscosity of the final resin coating solution was decreased by 65% compared to a 25% solids NFM-only dilution. No fuming or odor was observed upon a 250° C. cure of the resin. The color of the final solution and film was lighter in hue compared to the NFM only dilution. Better adhesion, cohesion, and less bubbling in the final film was observed.

Coating Composition Embodiment Example 9

PAI powder was diluted in NFM at 32.4 wt/wt % resin concentration. The PAI resin was further diluted to 25% solids with isopropyl alcohol (equivalent to a total weight percent of 22% co-solvent). Viscosity and film tests were performed. The viscosity of the final resin coating solution was decreased by 70-75% compared to a 25% solids NFM only dilution. No fuming or odor was observed upon a 250° C. cure of the resin. The color of the final coating solution and coated film was lighter in hue compared to the NFM-only dilution. Better adhesion, cohesion, and less bubbling was observed in the final coated film.

Additional Coating Composition Examples

FIG. 1 includes tables 100a, 100b summarizing physical and chemical results of compositions of solvents and co-solvents, including reference examples (comp.) to provide a basis for comparison and other examples (emb.) according to various embodiments.

CO-SOLVENT EVALUATION EXAMPLES

FIGS. 2A, 2B show respective tables 200a, 200b illustrating physical and chemical results of screening to evaluate, inter alia, viscosity reduction of compositions according to various embodiments. Tables 200a, 200b include a reference example (comp.) to provide a basis for comparison and other examples (emb.) according to various embodiments.

In the evaluations represented in FIGS. 2A, 2B, a solution of PAI prepared in NFM at 33.5% solids is diluted, to an approximately 26-28% amount of solids within a 70:30 to 80:20 range of NFM:co-solvent (by weight) mixture ratios, by adding the appropriate amount of co-solvent. The ratio was varied, depending on the co-solvent used, in order to reduce precipitation of PAI in the solution. The viscosity was measured and compared to an equivalent control made with 100% NFM. A review of evaluations represented in tables 200a, 200b is set forth below.

Co-Solvent Evaluation Example 1

10.34 g of a 33.5 wt % PAI solution in NFM was weighed in a flask. 1.92 g of γ-Hexalactone was slowly added with agitation to give a 80:20 NFM:γ-Hexalactone solution with 28% PAI solids. This sample showed a 35% reduction in viscosity relative to an equivalent control made with 100% NFM.

Co-Solvent Evaluation Example 2

11.42 g of a 33.5 wt % PAI solution in NFM was weighed in a flask. 2.13 g of THF was slowly added with agitation to give a 80:20 NFM:THF solution with 28% PAI solids. This sample showed a 76% reduction in viscosity relative to an equivalent control made with 100% NFM.

Co-Solvent Evaluation Example 3

11.52 g of a 33.5 wt % PAI solution in NFM was weighed in a flask. 2.14 g of furfuryl alcohol was slowly added with agitation to give a 80:20 NFM:furfuryl alcohol solution with 28% PAI solids. This sample showed a 7% reduction in viscosity relative to an equivalent control made with 100% NFM.

Co-Solvent Evaluation Example 4

11.66 g of a 33.5 wt % PAI solution in NFM was weighed in a flask. 2.17 g of acetophenone was slowly added with agitation to give a 80:20 NFM:acetophenone solution with 28% PAI solids. This sample showed a 34% reduction in viscosity relative to an equivalent control made with 100% NFM.

Co-Solvent Evaluation Example 5

11.44 g of a 33.5 wt % PAI solution in NFM was weighed in a flask. 2.13 g of cumene was slowly added with agitation to give a 80:20 NFM:cumene solution with 28% PAI solids. This sample showed a 45% reduction in viscosity relative to an equivalent control made with 100% NFM.

Co-Solvent Evaluation Example 6

The composition of Co-solvent Evaluation Example 1, except the co-solvent evaluated was cyclopentylmethyl ether. This sample showed a 64% reduction in viscosity relative to an equivalent control made with 100% NFM.

Co-Solvent Evaluation Example 7

The composition of Co-solvent Evaluation Example 1, except the co-solvent evaluated was methyl-THF. This sample showed a 73% reduction in viscosity relative to an equivalent control made with 100% NFM.

Co-Solvent Evaluation Example 8

The composition of Co-solvent Evaluation Example 1, except the co-solvent evaluated was N-octyl pyrrolidone. This sample showed a 29% reduction in viscosity relative to an equivalent control made with 100% NFM.

Co-Solvent Evaluation Example 9

25.92 g of a 33.5 wt % PAI solution in NFM was weighed in a flask. 8.42 g Rhodiasolv® PolarClean was slowly added with agitation to give an 70:30 NFM:Rhodiasolv® Polar-Clean solution with 25.3% PAI solids. This sample showed an 30% increase in viscosity (the reason for the negative sign in the table) relative to an equivalent control made with 100% NFM.

Co-Solvent Evaluation Example 10

32.05.22 g of a 33.5 wt % PAI solution in NFM was weighed in a flask. 10.42 g propylene carbonate was slowly added with agitation to give a 70:30 NFM:propylene carbonate solution with 25.3% PAI solids. This sample showed a 1% reduction in viscosity relative to an equivalent control made with 100% NFM.

Co-Solvent Evaluation Example 11

The composition of Co-solvent Evaluation Example 9, except the co-solvent evaluated was dioxalane. This sample showed a 72% reduction in viscosity relative to an equivalent control made with 100% NFM.

Co-Solvent Evaluation Example 12

The composition of Co-solvent Evaluation Example 9, except the co-solvent evaluated was methylethylketone. This sample showed an 88% reduction in viscosity relative to an equivalent control made with 100% NFM.

Co-Solvent Evaluation Example 13

The composition of Co-solvent Evaluation Example 9, except the co-solvent evaluated was dimethylsuccinate. This sample showed a 32% reduction in viscosity relative to an equivalent control made with 100% NFM.

Co-Solvent Evaluation Example 14

The composition of Co-solvent Evaluation Example 9, except the co-solvent evaluated was TamiSolve® NXG. This sample showed a 47% reduction in viscosity relative to an equivalent control made with 100% NFM.

What is claimed is:

1. A coating composition comprising:
   at least one polyamideimide resin;
   at least one aprotic dialkylamide solvent selected from a group consisting of N-acetyl morpholine, diethyl acetamide, di-N-propyl acetamide, N-formyl morpholine, diacetylpiperazine, N,N-diisopropylacetamide, di-N-butylacetamide, di-N-propylacetamide and N-propionyl morpholine; and
   at least one co-solvent is selected from a group consisting of methyl acetate, n-propyl acetate, t-butyl acetate, iso-butyl acetate, ethyl acetate, isopropyl acetate, methyl lactate, ethyl lactate, n-propyl lactate, isopropyl lactate, n-butyl lactate, isobutyl lactate, t-butyl lactate, cyclohexanone, cyclopentanone, n-butyl acetate, methyl alcohol, ethyl alcohol, isopropyl alcohol, ε-caprolactone and methylcyclohexane;
   wherein a ratio of all aprotic dialkylamide solvents to all co-solvents is in a range from 95:5 to 55:4.

2. The coating composition of claim 1, wherein the at least one aprotic dialkylamide solvent is N-acetyl morpholine.

3. The coating composition of claim 1, wherein the at least one aprotic dialkylamide solvent is N-formyl morpholine.

4. The coating composition of claim 1, wherein the at least one co-solvent is selected from a group consisting of methyl acetate, n-propyl acetate, ethyl acetate, isopropyl acetate, ethyl lactate, n-propyl lactate, n-butyl lactate, cyclohexanone, cyclopentanone, n-butyl acetate, isopropyl alcohol, ε-caprolactone and methylcyclohexane.

5. The coating composition of claim 1, wherein a ratio of all aprotic dialkylamide solvents to all co-solvents is in a range from 90:10 to 70:30.

6. The coating composition of claim 1, wherein a ratio of the total of quantity of all aprotic dialkylamide solvents plus all co-solvents to polyamideimide is in a range from 85:15 to 60:40.

7. The coating composition of claim 1, wherein a ratio of the total of quantity of all aprotic dialkylamide solvents plus all co-solvents to polyamideimide is in a range from 80:20 to 65:35.

8. The coating composition of claim 1, wherein the polyamideimide resin is a product of 4,4'-methylene diphenyldiisocyanate and trimellitic anhydride.

9. A coating composition comprising:
   at least one polyamideimide resin;
   at least one aprotic dialkylamide solvent selected from a group consisting of N-acetyl morpholine, diethyl acetamide, di-N-propyl acetamide, N-formyl morpholine, diacetylpiperazine, N,N-diisopropylacetamide, di-N-butylacetamide, di-N-propylacetamide and N-propionyl morpholine; and
   at least one co-solvent is selected from a group consisting of methyl acetate, n-propyl acetate, t-butyl acetate, iso-butyl acetate, ethyl acetate, isopropyl acetate, methyl lactate, ethyl lactate, n-propyl lactate, isopropyl lactate, n-butyl lactate, isobutyl lactate, t-butyl lactate, cyclohexanone, cyclopentanone, n-butyl acetate, methyl alcohol, ethyl alcohol, isopropyl alcohol, anisol, ε-caprolactone, methylcyclohexane, N-n-butylpyrrolidone, N-isobutylpyrrolidone, N-t-butylpyrrolidone, N-n-pentylpyrrolidone, N-(methyl-substituted butyl) pyrrolidone, ring-methyl-substituted N-propyl pyrrolidone, ring-methyl-substituted N-butyl pyrrolidone, N-(methoxypropyl) pyrrolidone, N-(methoxypropyl) pyrrolidone, 1,5-dimethyl-pyrrolidone and isomers thereof, dipropylene glycol dimethyl ether, a mixture including ethyl lactate and an ethyl ester derived from soya bean oil or corn oil, poly(ethylene glycol) dimethyl ether, diethylene glycol diethyl ether, 1,3-dioxolane, dimethyl sulphoxide, methyl-5-(di methylamino)-2-methyl-5-oxopentanoate, TamiSolve® NxG, propylene glycol methyl ether acetate, choline hydroxide, propylene carbonate, diethyl carbonate, glycerine carbonate, dimethylisopropylamine and isomers thereof, dihydrolevo glucosenone, octyl pyrrolidone and isomers thereof, N-methyl-ε-caprolactam, N,N,N',N'-tetramethylguanidine, 2-pyrrolidone, 2,2-dimethyl dioxolane-4-methanol and isomers thereof, Rhodiasolv® RPDE-K, Rhodiasolv® PolarClean, Rhodiasolv® Infinity, Rhodiasolv® IRIS, diethylethanolamine, γ-hexalactone, tetrahydrofuran, furfuryl alcohol, acetophenone, cumene, cyclopentylmethyl ether, methyl-tetrahydrofuran, N-octyl pyrrolidone, dioxalane, methylethylketone, dimethylsuccinate, N-methylcaprolactame and N-cyclohexylpyrrolidone;
   wherein a ratio of all aprotic dialkylamide solvents to all co-solvents is in a range from 95:5 to 55:45.

10. The coating composition of claim 9, wherein the at least one aprotic dialkylamide solvent is N-acetyl morpholine.

11. The coating composition of claim 9, wherein the at least one aprotic dialkylamide solvent is N-formyl morpholine.

12. The coating composition of claim 9, wherein a ratio of all aprotic dialkylamide solvents to all co-solvents is in a range from 90:10 to 70:30.

13. The coating composition of claim 9, wherein a ratio of the total of quantity of all aprotic dialkylamide solvents plus all co-solvents to polyamideimide is in a range from 85:15 to 60:40.

14. The coating composition of claim 9, wherein a ratio of the total of quantity of all aprotic dialkylamide solvents plus all co-solvents to polyamideimide is in a range from 80:20 to 65:35.

15. The coating composition of claim 9, wherein the polyamideimide resin is a product of 4,4'-methylene diphenyldiisocyanate and trimellitic anhydride.

* * * * *